(12) United States Patent
Shin

(10) Patent No.: US 9,444,943 B2
(45) Date of Patent: Sep. 13, 2016

(54) MULTIMEDIA APPARATUS, METHOD, AND COMPUTER READABLE MEDIUM FOR PROVIDING HANDS-FREE SERVICE FOR VEHICLE

(71) Applicant: Hyundai Motor Company, Seoul (KR)

(72) Inventor: Soo Young Shin, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 186 days.

(21) Appl. No.: 14/287,707

(22) Filed: May 27, 2014

(65) Prior Publication Data

US 2015/0163334 A1 Jun. 11, 2015

(30) Foreign Application Priority Data

Dec. 9, 2013 (KR) .................. 10-2013-0152439

(51) Int. Cl.
*H04M 3/54* (2006.01)
*H04W 4/00* (2009.01)
*H04W 4/16* (2009.01)
*H04M 1/60* (2006.01)

(52) U.S. Cl.
CPC .......... *H04M 3/543* (2013.01); *H04M 1/6091* (2013.01); *H04W 4/008* (2013.01); *H04W 4/16* (2013.01); *H04M 2250/02* (2013.01)

(58) Field of Classification Search
CPC . H04M 1/6075; H04M 3/543; H04W 4/008; H04W 4/16
USPC ....................................... 455/41.2
See application file for complete search history.

(56) References Cited

U.S. PATENT DOCUMENTS

| 7,079,015 | B2 | 7/2006 | Gibeau | |
| 2004/0204161 | A1* | 10/2004 | Yamato | H04M 1/6091 455/569.1 |
| 2011/0084807 | A1* | 4/2011 | Logan | H04Q 9/00 340/10.1 |

FOREIGN PATENT DOCUMENTS

| JP | 2003078607 A | 3/2003 |
| JP | 2005203943 A | 7/2005 |
| JP | 2005354312 A | 12/2005 |
| KR | 10-2013-0021998 | 3/2013 |
| KR | 10-2013-0052862 | 5/2013 |

* cited by examiner

*Primary Examiner* — Ping Hsieh
*Assistant Examiner* — Xin Jia
(74) *Attorney, Agent, or Firm* — Mintz Levin Cohn Ferris Glovsky and Popeo, P.C.; Peter F. Corless

(57) ABSTRACT

A multimedia device and method provide a hands-free service to automatically or manually perform hands-free connection according to a driver's situation. The multimedia device includes a communication unit configured to perform BLUETOOTH communication with a mobile terminal, a sensor unit including a sensor configured to sense opening and closing of a door of a vehicle and sense a change in pressure generated in seats provided in the vehicle, and a controller, when BLUETOOTH communication is connected to the mobile terminal which is performing call communication, configured to switch the call to a hands-free service upon determining whether the door is opened or closed and a change in pressure generated in a seat.

12 Claims, 3 Drawing Sheets

MULTIMEDIA APPARATUS, METHOD, AND COMPUTER READABLE MEDIUM FOR PROVIDING HANDS-FREE SERVICE FOR VEHICLE

CROSS-REFERENCE TO RELATED APPLICATION

This application is based on and claims under 35 U.S.C. §119(a) priority from Korean Patent Application No. 10-2013-0152439, filed on Dec. 9, 2013, in the Korean Intellectual Property Office, the disclosure of which is incorporated herein in its entirety by reference.

BACKGROUND (a) Field of the Invention

The present invention relates to a multimedia apparatus, method, and computer readable medium for providing hands-free service in a vehicle, and, more particularly, to an arrangement for providing a hands-free service capable of automatically or manually performing a hands-free connection according to a driver's situation.

(b) Description of the Related Art

Recently, vehicle hands-free is provided for short distance wireless communication such as BLUETOOTH, and the like, to maximally guarantee autonomous drivers when driving. A wireless hands-free system performs wireless communication with a paired mobile terminal to allow a driver to continuously perform a voice call by using a speaker, a microphone, and the like of a vehicle without holding the mobile terminal in his or her hands.

However, although the driver leaves the vehicle in a state in which the mobile terminal is paired, if he or she is within a radius in which wireless communication is available, the related art wireless hands-free system provides a hands-free service. Thus, even in the case when the driver leaves the vehicle in a state of being paired with the wireless hands-free system, if the driver's mobile terminal is present within the radius in which wireless communication is available, a voice call terminates the wireless hands-free system paired with the mobile terminal, rendering it impossible for the driver to receive a voice call.

SUMMARY

One object to be achieved by the present invention is to provide a multimedia apparatus and a method for a vehicle capable of providing a hands-free service to automatically or manually perform hands-free connection according to a driver's situation.

In one aspect of the present invention, there is provided a multimedia device for a vehicle providing hands-free service, including: a communication unit configured to perform BLUETOOTH communication with a mobile terminal; a sensor unit including a sensor configured to sense opening and closing of a door of the vehicle and sense a change in pressure generated in seats provided in the vehicle; and a controller, when BLUETOOTH communication is connected to the mobile terminal which is performing call communication, configured to switch the call to a hands-free service upon determining whether the door is opened or closed and a change in pressure generated in a seat.

When a closed state of the door is maintained, the controller may maintain the call on the mobile terminal.

When the door is opened and it is determined that pressure only at a driver's seat, among the seats, has been changed, the controller may switch the call to the hands-free service.

When the door is opened and it is determined that a change in pressure at the driver's seat and at any one seat, among the seats excluding the driver's seat, has been sensed, the controller may output a message for selecting whether to perform call forwarding.

When call forwarding is selected based on the message, the controller may switch the call to the hands-free service, and when call forwarding is not selected, the controller may maintain the call on the mobile terminal.

In another aspect of the present invention, there is provided a method for providing a hands-free service, including: when a controller enters a hands-free mode with respect to the mobile terminal, activating at least one sensor; when it is determined that the mobile terminal is in a call state, determining whether a door of a vehicle is opened and closed as sensed by the sensor; when it is determined that the door has been opened and closed, checking a change in pressure generated in a seat provided in the vehicle as sensed by the sensor; and switching the call to a hands-free service according to the checked change in pressure.

The determining whether the door of the vehicle is opened and closed may include: when a closed state of the door of the vehicle is maintained, maintaining the call on the mobile terminal.

The checking of a change in pressure may include: when it is determined that a door of the vehicle is opened, determining whether pressure at only the driver's seat, among seats provided in the vehicle, is changed; and determining whether pressure of at least any one seat, among the seats, excluding the driver's seat, provided in the vehicle, is changed.

In the switching of the call to the hands-free service, when it is determined that pressure only at the driver's seat has been changed, the call may be switched to the hands-free service.

The switching of the call to the hands-free service may include: when it is determined that pressure at the driver's seat and pressure of at least one seat among the seats excluding the driver's seat, have been changed, outputting a message for selecting whether to perform call forwarding; and when call forwarding is selected based on the message, switching the call to the hands-free service, and when call forwarding is not selected, maintaining the call on the mobile terminal.

The method may further include: performing BLUETOOTH communication pairing with the mobile terminal, before the activating of the at least one sensor.

A non-transitory computer readable medium containing program instructions executed by a processor on a controller preferably includes: program instructions that activate at least one sensor when the controller enters a hands-free mode with respect to a mobile terminal; program instructions that determine whether a door of a vehicle is opened and closed as sensed by the sensor when it is determined that the mobile terminal is in a call state; program instructions that check a change in pressure generated in a seat provided in the vehicle as sensed by the sensor when it is determined that the door has been opened and closed; and program instructions that switch the call to a hands-free service according to the checked change in pressure.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described in more detail with reference to the accompanying drawings. In describing the exemplary embodiments of the present invention, a description of technical contents that are well-known in the art to which the present invention pertains and are not directly related to the present invention will be omitted if possible. The reason why an unnecessary description is omitted is to make the gist of the present invention clear.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Although the below exemplary embodiment is described as using a single controller/processor to perform the above process, it is understood that the above processes may also be performed by a plurality of controllers/processors.

Figure 1:
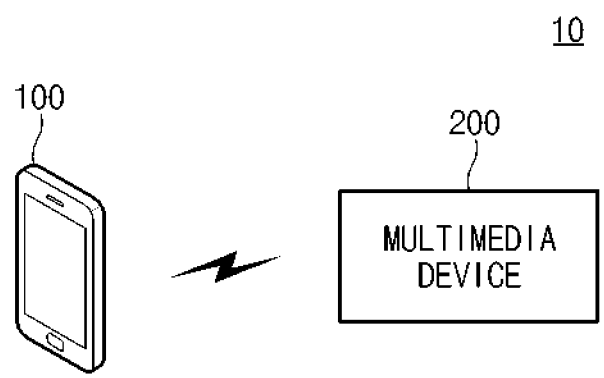
FIG. 1 is a schematic view illustrating a hands-free system according to an exemplary embodiment of the present invention.
Figure 2:
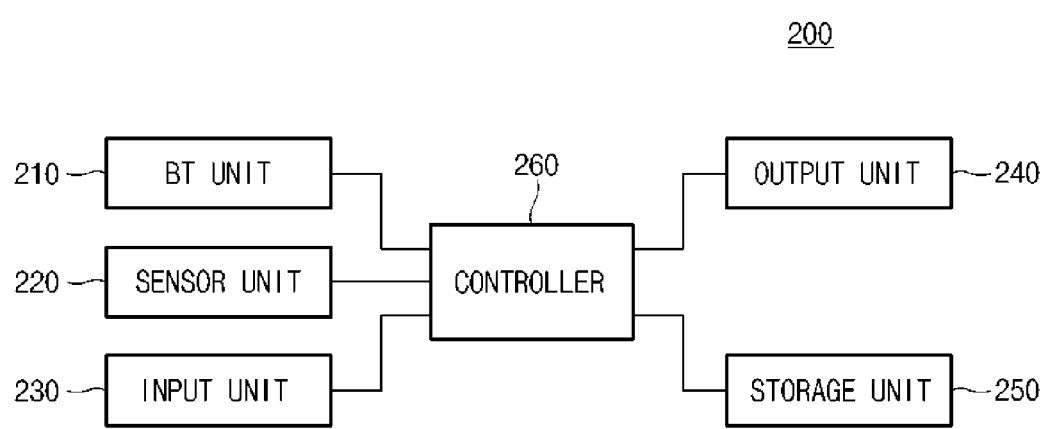
FIG. 2 is a block diagram illustrating major elements of a multimedia apparatus according to an exemplary embodiment of the present invention.

FIG. 1 is a schematic view illustrating a hands-free system according to an exemplary embodiment of the present invention. FIG. 2 is a block diagram illustrating major elements of a multimedia apparatus according to an exemplary embodiment of the present invention.

Referring to FIGS. 1 and 2, a hands-free system 10 according to an exemplary embodiment of the present invention may include a mobile terminal 100 and a multimedia device 200.

The mobile terminal 100 preferably is configured to perform BLUETOOTH communication with the multimedia device 200. While the mobile terminal 100 is in a call state, when a call forward signal is received from the multimedia device 200 connected to the mobile terminal 100 for BLUETOOTH communication, the mobile terminal 100 transmits a call signal through BLUETOOTH communication to allow the multimedia device 200 to perform call communication.

The multimedia device 200 performs BLUETOOTH communication with the mobile terminal 100 in a call state, and switches the call performed on the mobile terminal 100 to a hands-free service by determining whether a vehicle door is opened or closed and a change in pressure generated in a seat. To this end, the multimedia device 200 may include a communication unit 210 that utilizes BLUETOOTH communication, a sensor unit 220, an input unit 230, an output unit 240, a storage unit 250, and a controller 260. In an exemplary embodiment of the present invention, the multimedia device 200 may be a device generally provided in a vehicle, including an audio/video/navigation (AVN) device.

The communication unit 210 performs BLUETOOTH communication with the mobile terminal 100.

The sensor unit 220 may include a sensor sensing whether a starter of a vehicle is remotely turned on, a sensor sensing whether a door provided in the vehicle is opened and closed, and a sensor sensing a change in pressure generated in a seat provided in the vehicle. The sensor unit 220 is activated under the control of the controller 260 and provides various types of sensed information to the controller 260.

The input unit 230 receives a signal for BLUETOOTH communication connection to the mobile terminal 100 from a driver, and receives a signal for entering a hands-free mode. To this end, the input unit 230 may be formed as a keypad, a touch pad, a touch screen, and the like, and in a case in which the input unit 230 is formed as a touch screen, it may also perform a function of the output unit 240.

The output unit 240 may output a selection message for switching the call performed on the mobile terminal 100 to the hands-free mode and provides the same to the driver. The output unit 240 may output screens with respect to various operations performed in the multimedia device 200, such as activation of BLUETOOTH communication, switchover to the hands-free mode, and the like, under the control of the controller 260.

The storage unit 250 may store a hands-free application received from an App server (not shown) or programs for various operations performed in the multimedia device 200.

When BLUETOOTH communication is connected with the mobile terminal 100 which is performing call communication, the controller 260 switches the call performed on the mobile terminal 100 to the hands-free service, upon checking whether the door provided in the vehicle is opened and closed and a change in pressure generated in a seat provided in the vehicle.

In detail, the controller 260 turns on a starter of the vehicle through a remote controller capable of controlling turn-on of the starter of the vehicle from the outside of the vehicle or according to a starter ON signal through a starter button provided within the vehicle. After the starter of the vehicle is turned on, when activation of the hands-free service is in a pre-set state, the controller 260 activates BLUETOOTH communication and enters the hands-free mode. Conversely, when activation of the hands-free service is not in the pre-set state, the controller 260 activates BLUETOOTH communication on the basis of an input of the input unit 230 and enters the hands-free mode. In the hands-free mode, the controller 260 activates the sensor unit 220.

In a state in which the multimedia device 200 is connected with the mobile terminal 100 for BLUETOOTH communication, when the mobile terminal 100 is determined as being in a call state, the controller 260 determines whether the starter of the vehicle is controlled remotely. When the starter of the vehicle is turned on by the starter button provided within the vehicle, rather than being remotely controlled, the controller 260 determines whether only pressure of a driver's seat provided in the vehicle has been changed, on the basis of sensing information provided from the sensor unit 220. When there is no change in pressure of a seat provided in the vehicle, the controller 260 determines that a driver has not entered the vehicle, and maintains the ongoing call on the mobile terminal 100.

Conversely, when pressure only at the driver's seat is changed, the controller 260 determines that the driver has sat down in the driver's seat, and switches the call performed on the mobile terminal 100 to the hands-free service. Also, after the change in the pressure at the driver's seat, when pressure of a passenger seat or a back seat is changed, the controller 260 determines that a user and a different person are present within the vehicle, and outputs a message for call forward selection to the output unit 240. When a call forward selection signal is received through the input unit 230, the controller 260 may switch the call performed on the mobile terminal 100 to the hands-free service. When the call forward selection signal is not received, the controller 260 may continuously perform the ongoing call on the mobile terminal 100.

When the starter of the vehicle is controlled remotely by the remote controller, the controller 260 determines whether a closed state of a door provided in the vehicle is maintained on the basis of sensing information provided from the sensor unit 220. When the closed state of the door is maintained, the controller 260 determines that the driver has not entered the vehicle and maintains the ongoing call on the mobile terminal 100. Meanwhile, when the closed state of the door is not maintained, namely, when the closed state of the door has been changed into an open state, the controller 260 checks a change in pressure generated in a seat provided in the vehicle on the basis of sensing information provided from the sensor unit 220, and controls the call performed on the mobile terminal 100 to be forwarded or to be maintained. Forwarding or maintaining of the call performed on the mobile terminal 100 based on a change in pressure generated in a seat of the vehicle has been described above, so a detailed description thereof will be omitted.

Figure 3:
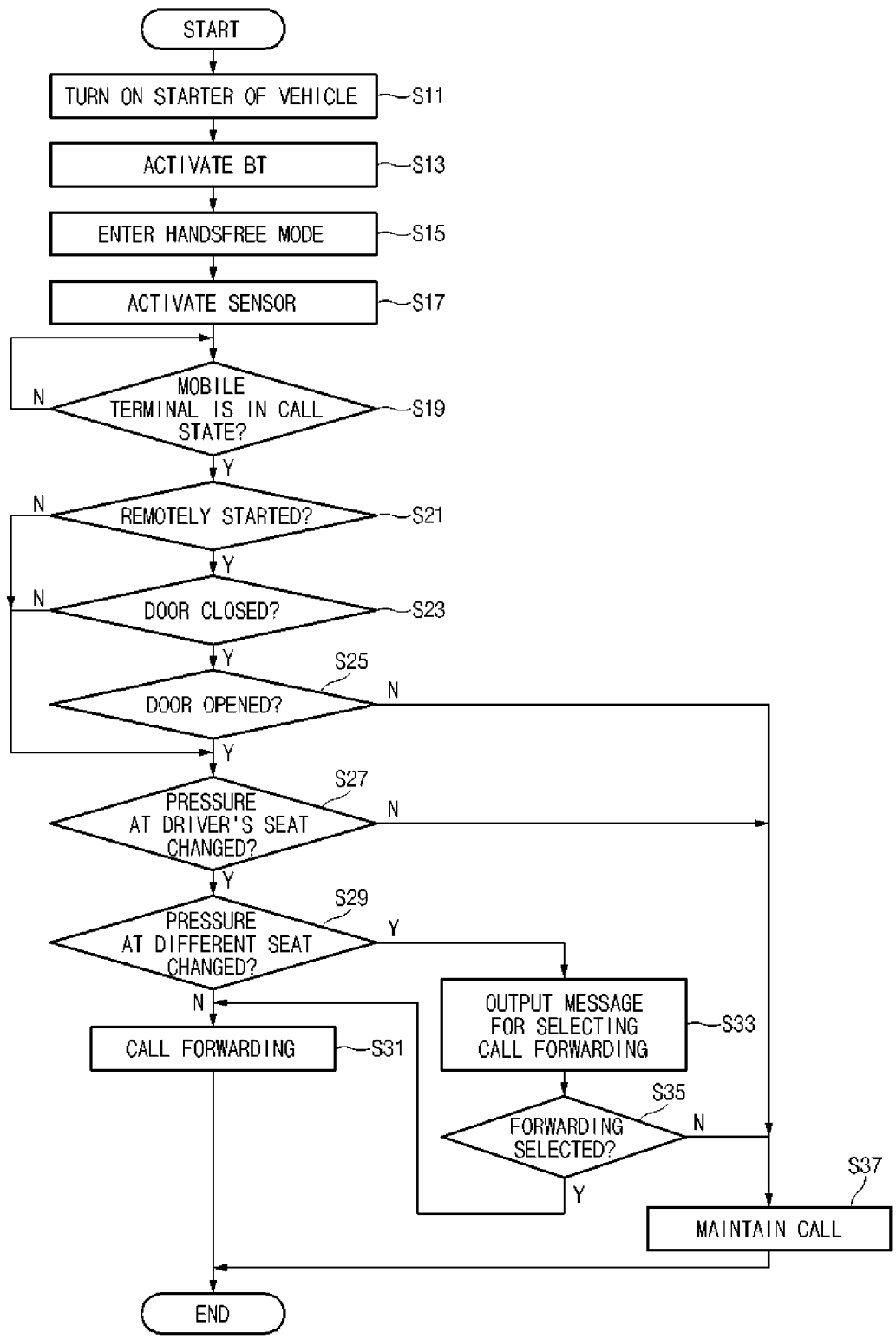
FIG. 3 is a flow chart illustrating a method for providing a hands-free service according to an exemplary embodiment of the present invention.

FIG. 3 is a flow chart illustrating a method for providing a hands-free service according to an exemplary embodiment of the present invention.

Referring to FIGS. 1 through 3, the controller 260 turns on the starter of the vehicle on the basis of an input from the outside in operation S11. In this case, the input from the outside may be an input through the starter button provided in the vehicle or may be an input by the remote controller that may be able to control the vehicle remotely.

The controller 260 activates BLUETOOTH communication in operation S13. In this case, the controller 260 may activate BLUETOOTH communication according to an input of the input unit 230, and when the starter of the vehicle is turned on, if activation of the hands-free service is in a pre-set state, the controller 260 may perform control to activate the BLUETOOTH communication.

The controller 260 performs communication with the mobile terminal 100 through the BLUETOOTH communication and enters the hands-free mode to provide a hands-free service in operation S15. In this case, the controller 260 may select a hands-free application, which has been downloaded from an App server (not shown) and stored, to enter the hands-free mode, or may execute a program for providing the hands-free service previously stored in the storage unit 250 to enter the hands-free mode. Also, when the starter of the vehicle is turned on, if activation of the hands-free service is in a pre-set state, the controller 260 may enter the hands-free mode.

In the hands-free mode, the controller 260 activates sensors included in the sensor unit 220 in operation S17. When it is determined that the mobile terminal 100 connected for BLUETOOTH communication is performing call communication in operation S19, the controller 260 determines whether the starter of the vehicle is remotely controlled in operation S21. When the starter of the vehicle is turned on remotely according to the determination result of operation S21, the controller 260 performs operation S23, or otherwise, the controller 260 performs operation S27.

In operation S23, the controller 260 determines whether a door provided in the vehicle is in a closed state on the basis of sensing information received from the sensor unit 220. When the door is in a closed state according to the determination results in operation S23, the controller 260 determines whether opening of the closed door is sensed in operation S25. When opening of the door is sensed according to the determination results in operation S25, the controller 260 performs operation S27, or otherwise, the controller 260 performs S37.

In operation S37, the controller 260 provides a signal to allow the call, which has been ongoing on the mobile terminal 100, to be continuously performed. In this manner, in the exemplary embodiment of the present invention, when the vehicle is started remotely in a state in which the mobile terminal 100 performs call communication and a door of the vehicle is not opened, it is determined that the driver has not entered the vehicle and the call communication on the mobile terminal 100 may be continuously maintained. Thus, since the call is continuously maintained on the mobile terminal 100 when the driver is not present within the vehicle, user inconvenience such as a call being cut off may be minimized.

Conversely, when the starter of the vehicle is not remotely controlled in operation S21, when a door of the vehicle is not closed (a door is opened) in operation S23, or when it is determined that a door is opened in operation S25, the controller 260 performs operation S27. In operation S27, the controller 260 determines whether a change in pressure at the driver's seat, among seats provided in the vehicle, is sensed on the basis of sensing information received from the sensor unit 220. When a change in pressure at the driver's seat is sensed according to the determination results, the controller 260 performs operation S29, or otherwise, the controller 260 performs operation S37 to provide a signal to allow the mobile terminal 100 to continuously perform the ongoing call. Thus, in a state in which the starter of the vehicle is remotely turned on and a door of the vehicle is opened, if a change in pressure at the driver's seat is not sensed, it is determined that the driver has not entered in the vehicle and the call may be continuously maintained on the mobile terminal 100. Also, in the exemplary embodiment of the present invention, in a case in which the starter of the vehicle is not remotely turned on, whether the driver has entered the vehicle may be determined only by sensing a change in pressure at the driver's seat, without having to sense whether a door of the vehicle is opened and closed.

Subsequently, the controller 260 determines whether a change in pressure at the passenger seat or the back seat, a different seat, excluding the driver's seat, among the seats provided in the vehicle is sensed on the basis of sensing information received from the sensor unit 220 in operation S29. When a change in pressure at the different seat is not sensed according to the determination results, the controller 260 transmits a call forward signal to the mobile terminal 100 to allow the multimedia device 200 to perform the call, which has been performed on the mobile terminal 100, in operation S31. Also, the controller 260 continuously performs the call upon receiving a call signal from the mobile terminal 100. Thus, since the driver may use the hands-free service when he or she sits on the driver's seat, without someone else present in a different seat, the driver's privacy may be protected.

Conversely, when a change in pressure at a different seat is sensed in operation S29, the controller 260 outputs a message for selecting whether to perform call forwarding, to the output unit 240 in operation S33. When a call switchover menu for switching the call ongoing on the mobile terminal 100 to the hands-free service is selected through the input unit 230 in operation S35, the controller 260 transmits a call forward signal to the mobile terminal 100 in operation S31. Also, the controller 260 continuously performs the call upon receiving a call signal from the mobile terminal 100. Meanwhile, if the call switchover menu is not selected through the input unit 230 in operation S35, the controller 260 provides a signal to allow the mobile terminal 100 to continuously perform the ongoing call in operation S37. In this manner, in the exemplary embodiment of the present invention, when someone else sits on the passenger seat or back seat, the driver is allowed to select whether to perform call forwarding to the hands-free service, thus protecting the driver's privacy.

According to the exemplary embodiment of the present invention, since a hands-free connection is automatically or manually performed according to a driver's situation, invasion of privacy that may occur as a call is connected to the hands-free service when a voice call is not received, when a voice call is disconnected, or when someone else is present in a vehicle can be prevented.

It should be interpreted that the scope of the present invention is defined by the following claims rather than the above-mentioned detailed description and all modifications or alterations deduced from the meaning, the scope, and equivalences of the claims are included in the scope of the present invention.

What is claimed is:

1. A multimedia device for a vehicle providing a hands-free service, the multimedia device comprising:
   a communication unit configured to perform BLUETOOTH communication with a mobile terminal;
   a sensor unit including a sensor configured to sense opening and closing of a door of the vehicle and sense a change in pressure generated in seats provided in the vehicle; and
   a controller, when BLUETOOTH communication is connected to the mobile terminal which is performing call communication, configured to determine whether a starter of the vehicle is remotely controlled by a remote controller and switch the call to a hands-free service upon determining whether the door is opened or closed and a change in pressure generated in a seat provided in the vehicle when the starter of the vehicle is turned on remotely,
   wherein the controller determines whether only pressure of the seat is changed when the starter of the vehicle is not turned on remotely.

2. The multimedia service according to claim 1, wherein when a closed state of the door is maintained, the controller maintains the call on the mobile terminal.

3. The multimedia service according to claim 2, wherein when the door is opened and it is determined that pressure only at a driver's seat, among the seats, has been changed, the controller switches the call to the hands-free service.

4. The multimedia service according to claim 2, wherein when the door is opened and it is determined that a change in pressure at a driver's seat and at any one seat, among the seats excluding the driver's seat, has been sensed, the controller outputs a message for selecting whether to perform call forwarding.

5. The multimedia service according to claim 4, wherein when call forwarding is selected based on the message, the controller switches the call to the hands-free service, and when call forwarding is not selected, the controller maintains the call on the mobile terminal.

6. A method for providing a hands-free service in a vehicle, the method comprising:
   when a controller enters a hands-free mode with respect to a mobile terminal, activating at least one sensor;
   when it is determined that the mobile terminal is in a call state, determining whether a starter of the vehicle is remotely controlled by a remote controller;
   when the starter of the vehicle is turned on remotely, determining whether a door of the vehicle is opened or closed as sensed by the sensor;
   when it is determined that the door has been opened or closed, checking a change in pressure generated in a seat provided in the vehicle as sensed by the sensor; and
   switching the call to a hands-free service according to the checked change in pressure,
   wherein the controller determines whether only pressure of the seat is changed when the starter of the vehicle is not turned on remotely.

7. The method according to claim 6, wherein the determining whether the door of the vehicle is opened or closed includes:
   when a closed state of the door of the vehicle is maintained, maintaining the call on the mobile terminal.

8. The method according to claim 6, wherein the checking of the change in pressure includes:
   when it is determined that the door of the vehicle is opened, determining whether pressure of only a driver's seat, among seats provided in the vehicle, is changed; and
   determining whether pressure of at least any one seat, among the seats, excluding the driver's seat, provided in the vehicle, is changed.

9. The method according to claim 8, wherein, in the switching of the call to the hands-free service, when it is determined that pressure only at the driver's seat has been changed, the call is switched to the hands-free service.

10. The method according to claim 8, wherein the switching of the call to the hands-free service includes:
    when it is determined that pressure at the driver's seat and pressure of the at least one seat among the seats excluding the driver's seat, have been changed, outputting a message for selecting whether to perform call forwarding; and when call forwarding is selected based on the message, switching the call to the hands-free service, and when call forwarding is not selected, maintaining the call on the mobile terminal.

11. The method according to claim 6, further comprising: performing BLUETOOTH communication pairing with the mobile terminal, before the step of activating the at least one sensor.

12. A non-transitory computer readable medium containing program instructions executed by a processor on a controller, the computer readable medium comprising:

program instructions that activate at least one sensor when the controller enters a hands-free mode with respect to a mobile terminal;

program instructions that determine whether a starter of a vehicle is remotely controlled by a remote controller when it is determined that the mobile terminal is in a call state;

program instructions that determine whether a door of the vehicle is opened or closed as sensed by the sensor when the starter of the vehicle is turned on remotely;

program instructions that check a change in pressure generated in a seat provided in the vehicle as sensed by the sensor when it is determined that the door has been opened or closed; and program instructions that switch the call to a hands-free service according to the checked change in pressure, wherein the controller determines whether only pressure of the seat is changed when the starter of the vehicle is not turned on remotely.

* * * * *